United States Patent [19]

Cosper et al.

[11] Patent Number: 4,554,026

[45] Date of Patent: * Nov. 19, 1985

[54] AQUEOUS HYDROTROPE SOLUTIONS FOR PAINT DETACKIFIERS

[75] Inventors: David R. Cosper, Downers Grove, Ill.; Gretchen L. McKay, Cincinnati, Ohio

[73] Assignee: Nalco Chemical Company, Oak Brook, Ill.

[*] Notice: The portion of the term of this patent subsequent to Apr. 24, 2001 has been disclaimed.

[21] Appl. No.: 670,800

[22] Filed: Nov. 13, 1984

Related U.S. Application Data

[63] Continuation-in-part of Ser. No. 573,089, Jan. 23, 1984, Pat. No. 4,523,932, which is a continuation-in-part of Ser. No. 390,294, Jun. 21, 1982, Pat. No. 4,444,573.

[51] Int. Cl.$^4$ .................................................. B08B 7/00
[52] U.S. Cl. ........................................... 134/38; 55/84
[58] Field of Search ................. 134/22, 19, 38; 55/85, 55/89, 84, 87

[56] References Cited

U.S. PATENT DOCUMENTS

| | | | |
|---|---|---|---|
| 3,861,887 | 1/1975 | Forney | 55/85 |
| 4,067,806 | 1/1978 | Mauceri | 55/89 |
| 4,440,647 | 4/1984 | Puchalaski | 55/84 |
| 4,444,573 | 4/1984 | Cosper et al. | 55/89 |

*Primary Examiner*—Bernard Nozick
*Attorney, Agent, or Firm*—John G. Premo; Robert A. Miller; Donald G. Epple

[57] ABSTRACT

Aqueous hydrotrope solutions are useful as detackification aids for oversprayed paint solids.

6 Claims, No Drawings

AQUEOUS HYDROTROPE SOLUTIONS FOR PAINT DETACKIFIERS

This application is a continuation-in-part of copending Ser. No. 573,089 filed Jan. 23, 1984, now U.S. Pat. No. 4,523,932 which is in turn a continuation-in-part of copending application Ser. No. 390,294 filed June 21, 1982 and now U.S. Pat. No. 4,444,573.

This application relates to the use of aqueous solutions of certain hydrotrope materials as detackifiers for oversprayed paints and lacquers.

Our other two copending U.S. patent applications, Ser. No. 573,089 filed Jan. 23, 1984 now U.S. Pat. No. 4,523,932 and U.S. Pat. No. 4,444,573, which are both hereinafter incorporated by reference into this specification, disclose the use of aqueous hydrotrope solutions to recover volatile organic solvent carriers from oversprayed paints and lacquers. These applications further disclose methods for the recovery of volatile organic solvent paint carriers from the aqueous hydrotrope solution. Applicants have more recently discovered that when aqueous hydrotrope solutions are employed at certain dosage levels, generally much lower than those employed to recover organic solvent paint carriers, the hydrotropes serve to detackify oversprayed paint and lacquer solids. "The method of the invention comprises the detackification of oversprayed paint solids which comprises contacting such oversprayed paint solids with an aqueous hydrotrope solution and then recovering detackified paint solids."

The term "hydrotrope" here refers to a substance which has the property of increasing the aqueous solubility of a variety of otherwise insoluble or only slightly water-soluble organic chemicals. But more specifically, the hydrotrope of the present invention is a chemical substance which includes an organic group chemically bonded to a polar group. The organic group can be an aromatic, an aliphatic, or combinations thereof. When the organic group is an aliphatic, the carbon chain length can range from about $C_3$ to about $C_{10}$. When the aliphatic group has a chain length beyond $C_{10}$, the chemical substance acts as a surfactant. When such chemical substance is added to water, foaming is experienced. In the operations of paint spray booths, such foaming is undesirable.

When the organic group is an aromatic or a combination of aromatic and aliphatic, the chain length can range from about $C_6$ (as when benzene is the aromatic) to about $C_9$. Such chain length designation includes the aromatic group and the additional hydrocarbon group or groups chemically bonded thereto. Here again, the chemical substance acts as a surfactant beyond the $C_9$ chain length range.

The polar group of the hydrotrope can be a carboxylate, a phosphate, a phosphonate, a sulfate or a sulfonate, all of which are in the form of a salt. The above-described polar groups are salts of sodium, ammonium, cesium, potassium or any such salt which is highly water-soluble. The sodium, ammonium, cesium and potassium, of course, are the cationic portions of these salts. Such a salt, when chemically bonded to any one of the above-described organic groups, presents the chemical substance with surprising qualities. One quality is that the chemical substance, when added to water, greatly increases the water solubility of certain organic compounds, such as hydrocarbon-based solvents. Another quality is that the chemical substance itself is highly soluble in water. The chemical substances of the present invention perform as hydrotropic substances.

The hydrotropes of the present invention have a minimum carbon chain length restriction because if the organic group does not have an adequate number of carbon atoms, the chemical substance will not be effective in increasing the water solubility of organic solvents which are not normally water soluble. The key here is that the chemical substance have enough of an "organic character". Having such, the chemical substance can then cause such an organic solvent to become dissolved in water. Thus, a minimum carbon chain length restriction, as to the organic group, provides the chemical substance with this desired quality.

Particularly useful hydrotropes are sodium hexanoate, sodium octanoate, sodium xylenesulfonate, and sodium cumenesulfonate. Sodium hexanoate is a sodium salt of hexanoic acid. Sodium octanoate is a sodium salt of octanoic acid.

The sodium xylenesulfonate described here for purposes of teaching the present invention is available commercially from Witco Chemical Corporation of New York, N.Y. The sodium cumenesulfonate described here for purposes of teaching the present invention is a commercially available sulfonated cumene. As such, it is normally sulfonated in the para position, but may include some cumene sulfonated in the meta or ortho position. The sodium cumenesulfonate described here contains cumene which was sulfonated primarily in the para position.

When the aqueous hydrotrope solutions are employed to remove volatile organics as in our two previous applications, a higher level of the hydrotrope, 2–35%, is generally employed in the aqueous scrubbing liquid. However, we have surprisingly discovered that when the aqueous hydrotrope solutions are used to detackify oversprayed paint and lacquer contained in the scrubbing liquid, the hydrotrope may only be present in the aqueous scrubbing liquid at a level of from 250 ppm to 10,000 ppm of the scrubbing liquid, preferably 250 ppm to 3,000 ppm, and most preferably 250–1,000 ppm.

The above dosages are starting dosages, and we have discovered that as oversprayed paint is detackified, additional hydrotrope will have to be added. Typically, one part of hydrotrope will have to be added for each 1–50 parts of oversprayed paint detackified and preferably, 10–50 parts of oversprayed paint.

It is noted that it is preferred in the organic removal process disclosed in our other applications to remove oversprayed paint solids prior to recovering volatile organics. Use of the hydrotropes to detackify the oversprayed paint solids allows a unique and effective way to either detackify paint, remove organics, or in a single process to detackify the paint and to recover volatile organics.

We have found that the hydrotrope solutions are generally more efficient detackification aids for lacquers than for enamels, however, good detackification occurs when dosages of the hydrotrope are increased on many enamel materials.

In order to show the utility of this invention, the following examples are given:

DESCRIPTION OF TEST METHOD

A two-liter steel container having a bottom and side opening was prepared, and a recirculating line running from bottom to side was installed with an inline pump so as to recirculate the contents of the container from bottom to side.

An air aspirator was also obtained so that paint could be sprayed under pressure into the top of the vessel as to recirculate the contents of the container from bottom to side. Increasing the dosages of hydrotrope, satisfactory detackification would occur. In the Table, maintenance dosage is given as the ratio of paint/hydrotrope solution necessary to maintain a detackified paint solid.

TABLE I
HYDROTROPES AS DETACKIFIERS
RECIRCULATOR TEST RESULTS

| Decription | Light Blue Metallic Lacquer[1] | | Red High Solids Enamel[2] | | Brown High Solids Primer[3] | |
|---|---|---|---|---|---|---|
| | Initial Charge(ppm) | Maintenance Dosage | Initial Charge | Maintenance Dosage | Initial Charge(ppm) | Maintenance Dosage |
| 30% Sodium Hexanoate | 250 | 16/1 | No Detackification | — | 1,000 | 0.5/1 |
| 30% Sodium Octanoate | 300 | 40/1 | No Detackification | — | 500 | 1.2/1 |
| 30% Sodium Xylene Sulfonate | 1,000 | 18/1 | No Detackification | — | 500 | 8/1 |
| 33% Sodium Dodecyl Benzene Sulfonate | 500 | 36/1 | No Detackification | — | No Detackification | — |
| 7.7% Sodium Oleate | 250 | 32.8/1 | No Detackification | — | 1,000 | 2/1 |
| Polyamine with $ZnCl_2$ | 1,000 | 8/1 | Dispersed Sludge | — | 500 | 7/1 |

[1]Commercially available from DuPont de Nemours & Company
[2]Commercially available from PPG as WAEM 7211
[3]Commercially available from PPG as WAEM 11158 described above.

EXAMPLE 1

In the tests noted below, starting dosage is the ppm of hydrotrope in one liter of aqueous solution. Additional doses of hydrotrope are noted, as is the ratio of ppm paint/ppm hydrotrope necessary for detackification.

While results indicating satisfactory detackification are somewhat subjective, the term "detackification" indicates that the oversprayed enamel, lacquer, or primer solids did not adhere to the sides of the vessel and were easily removed. Indication of poor or no detackification indicates that the paint solids adhered to the sides of the vessel, and were "sticky" to the touch.

The hydrotrope solutions were prepared by adding the corresponding hydrotrope to water. In all cases pH was kept alkaline through the addition of sodium and/or potassium hydroxide since detackification occurs easier at higher pH values. Table I shows the evaluation of five (5) hydrotrope solutions as detackifiers for three (3) different paint materials. Also compared is a commercially available paint detackification material containing a water-soluble polyamine and zinc chloride similar to the type of product disclosed in U.S. Pat. No. 3,861,887.

In the Table it is noted that red high solids enamel was not detackified using commercially attractive dosages of hydrotrope solutions. However, in all cases, by increasing the dosages of hydrotrope, satisfactory detackification would occur. In the Table, maintenance dosage is given as the ratio of paint/hydrotrope solution necessary to maintain a detackified paint solid.

Having thus described my invention, I claim:

1. A method for the detackification of oversprayed paint solids which comprises contacting such oversprayed paint solids with an aqueous alkaline hydrotrope solution and then recovering detackified paint solids, said hydrotrope being selected from the group consisting of aliphatic and aromatic hydrotropes and blends thereof wherein when the hydrotrope is aliphatic, it contains from 3–10 carbon atoms and when it is aromatic, it contains from 6–9 carbon atoms, said hydrotrope being further characterized as containing a polar group from the group consisting of carboxylate, phosphate, phosphonate, sulfates, or sulfonates.

2. The method of claim 1 wherein the aqueous hydrotrope solution contains 250–3,000 ppm of a hydrotrope.

3. The method of claim 1 wherein the aqueous hydrotrope solution contains 250–1,000 ppm of a hydrotrope.

4. The method of claim 1 wherein the hydrotrope is selected from the group consisting of sodium hexanoate, sodium octanoate, sodium xylene sulphonate, sodium cumene sulphonate, and sodium dodecyl benzene sulphonate.

5. The method of claim 1 wherein the paint solid is a lacquer.

6. The method of claim 1 wherein the paint solid is an enamel.

* * * * *